JOHN MACATICIAN
*INVENTOR.*

United States Patent Office 3,284,246
Patented Nov. 8, 1966

3,284,246
HEAT RADIATION PROTECTED THERMOCOUPLE
John Macatician, P.O. Box 136, Lake Hopatcong, N.J.
Filed Nov. 30, 1962, Ser. No. 241,320
5 Claims. (Cl. 136—231)

The present invention relates to temperature measuring devices, and in particular, to such devices wherein the temperature sensing or detecting element is of the thermocouple type.

In the detection and measurement of temperature by means of thermocouples, it is a common problem that much heat is lost by radiation away from the heat detecting element and therefore the temperature at the element is not necessarily that of the environment temperature which it is presumably measuring. This error can be of considerable magnitude and it is essential that the radiation be reduced to as large an extent as possible in order that the accuracy of the thermocouple may be improved.

One way to reduce the extent of such heat radiation is to provide multiple walls about the thermocouple's detecting element with an air space between these walls. Multiple concentric tubes have been proposed for this purpose but they are usually quite complex to assemble, quite heavy and of such mass as to prevent a rapid response in the thermocouple to temperature change. The present invention essentially solves these problems through the employment of a novel structure which utilizes a very thin sheet or foil wound about the thermocouple in a spiral fashion in a number of loose turns or spaced coils.

It is, therefore, an object of the present invention to provide an improved thermocouple wherein heat radiation away from the temperature detecting element is minimized and the response and accuracy of the thermocouple is thus improved.

It is also an object of the present invention to provide an improved thermocouple of the type described in the foregoing paragraph wherein the heat radiation protection element or shield is lightweight, easily constructed but providing as many shielding surfaces as desirable and yet structurally rigid enough to be practical.

Other objects and advantages will be apparent from the description and claims which follow.

Figure 1:
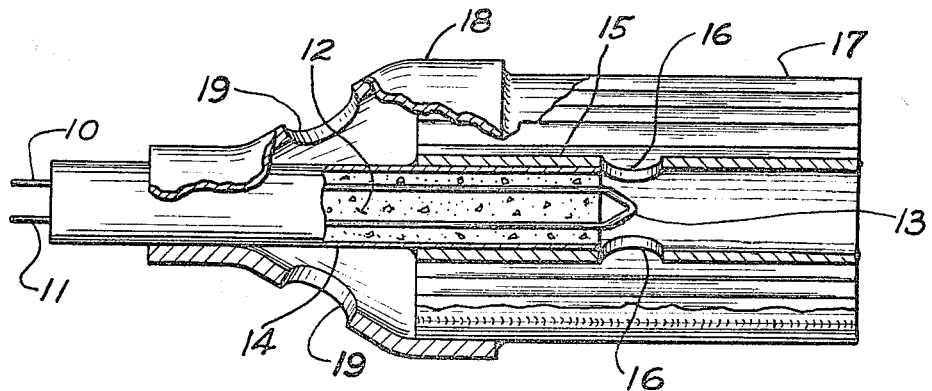
FIGURE 1 is a partially cutaway view taken in longitudinal section through the thermocouple and its shield.
Figure 2:
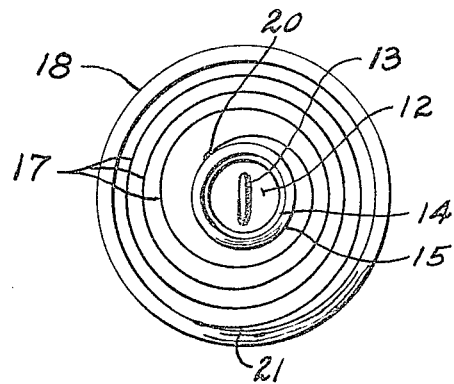
FIGURE 2 is an end view of the thermocouple and shield when viewed from the right in FIGURE 1.

In the preferred embodiment of my invention as seen in the figures of the drawing, thermocouple wires or elements 10 and 11 are embedded in ceramic insulator 12, pass through it longitudinally and extend outward from it at both ends. The exposed ends at the right hand in FIGURE 1 are joined in intimate welded contact as a thermocouple junction 13. Insulator 12 is encased in a coextensive metal tube 14 to which is attached near its thermocouple junction end, and extending outward and surrounding junction 13 as shown, a tubular member 15. Ports 16 are provided through the wall of member 15 in the vicinity of junction 13 to allow heat to reach the heat-sensitive junction freely and to allow free passage of reflected radiant heat and hot gases as explained later. A heat radiation shield 17 is disposed about tubular member 15 in a spiral winding in which each turn or coil of the winding is spaced from the previous one in the manner shown and the winding is at least co-extensive with the ports 16 and preferably as long as tube 15. Shield 17 is attached at its left hand end in FIGURE 1 to a bell-shaped support 18 also having ports 19 by welding and support 18 is in turn attached to tubular body 14 by welding or other suitable means. The foil or shield 17 is attached longitudinally to tubular member 15 as shown in FIGURE 2 at numeral 20 and is attached longitudinally upon itself as indicated by numeral 21 in FIGURE 2. These joints are made by welding or the like and provide longitudinal structural stiffness to shield 17.

Shield 17 is made of a heat-conductive material, metallic preferably, but not necessarily depending upon the environment to which it will be subjected, the metals preferred being molybdenum or tungsten, neither of which are likely to be adversely affected by high temperatures. The material must be in the form of a very thin foil preferably of the order of .001 inch to .002 inch but can be thicker if the additional mass can be tolerated as would be the case in a thermocouple of very large size.

In operation, essentially the whole unit is placed in the environment in which the temperature is to be measured and is held in place by suitable means (not shown) attached to body 14. Hot gas in the environment then passes into the open end of tubular member 15 and comes in contact with thermocouple junction 13, causing a thermoelectric current to flow through wires 10 and 11 to be measured by a suitable instrument (not shown). At the same time, junction 13 starts to radiate heat outward in all directions. Most of this radiant heat strikes against shield 17 and is in large part reflected back toward the junction 13 with only a small heat loss to the shield 17 itself because it is so thin and thus has little mass to carry the heat away. Radiant heat passing the first turn or coil of shield 17 is then largely reflected back by the second turn and this effect is repeated for each turn. A number of turns of the spiral shield are thus desirable if the radiant heat losses are to be reduced to a negligible value, five or more appearing to be the most desirable if structural considerations permit.

The hot gas, the temperature of which is being measured, flows freely around junction 13 and is free to pass through ports 16 and 19 and through the spaces between the spiral turns of shield 17.

It is to be understood that the form of the invention herewith shown and described is to be taken as a preferred example of the same and that various changes in the shape, size and arrangement of parts may be resorted to without departing from the spirit of the invention or the scope of the following claims.

What is claimed is:

1. A thermocouple comprising a body, a thermocouple junction exposed adjacent at least one end of said body, a heat-conductive foil heat radiation shield disposed about said junction in spaced relationship thereto, and means for attaching said shield to said body, said shield being spiral in cross-section and having a plurality of spaced spiral turns.

2. The invention recited in claim 1 wherein said shield is metallic.

3. A thermocouple comprising a tubular body, a thermocouple junction located adjacent one end thereof, means for transmitting electric current from said junction through said body, hollow tubular means extending from said body past said junction, at least one port in said tubular means in the vicinity of said junction, heat-conductive foil spirally wrapped longitudinally about said tubular means in spaced relationship thereto and to each previous coil of its spiral and at least co-extensive in length with the breadth of said port, and means for attaching the inner and outer extremities of said foil to said body.

4. The invention set forth in claim 3 with the inner extremity of said foil attached to said tubular means and the outer extremity attached to a support fastened to said body.

5. The invention set forth in claim 4 wherein at least one port is formed in said support.

References Cited by the Examiner

UNITED STATES PATENTS

| | | | |
|---|---|---|---|
| 1,169,617 | 1/1916 | Comfort | 136—4.4 |
| 1,791,020 | 2/1931 | Wilson | 136—4.5 |
| 2,291,448 | 7/1942 | Bragg | 136—4.5 |
| 2,404,060 | 7/1946 | Hall et al. | |
| 2,744,947 | 5/1956 | Ray | 136—4 |
| 3,075,387 | 1/1963 | Rademacher | 136—4 |

WINSTON A. DOUGLAS, *Primary Examiner.*

ALLEN B. CURTIS, *Examiner.*